UNITED STATES PATENT OFFICE.

CLAUDE MARIE GAUTIER, OF PUTNEY, LONDON, ENGLAND.

ARMORING PNEUMATIC TIRES.

1,143,265.  Specification of Letters Patent.  Patented June 15, 1915.

Application filed June 27, 1914. Serial No. 847,721.

*To all whom it may concern:*

Be it known that I, CLAUDE MARIE GAUTIER, a citizen of the French Republic, residing at Putney, London, England, have invented certain new and useful Improvements in the Armoring of Pneumatic Tires, of which the following is a specification.

This invention is for improvements in or relating to the armoring of pneumatic tires and has for its object to provide means whereby tires armored with chains placed transversely to the tread may be better protected. If chains are laid side by side and carried straight across the tread whether diagonally to the circumferential line or at right-angles to the same, it will be appreciated that gaps occur between the chains which increase in width toward, and reach their maximum width at, the center of the tread, so that even if the chains are put close together at the beads they are gaping at the tread, whereas it is at the tread that the greatest protection is required. To obviate this defect it is proposed, according to the present invention, to arrange the chains so that the angle at which they lie to the circumferential direction of the tire becomes more acute toward the center of the tread, the acuteness increasing to a maximum at the said center to evenly cover the whole area with the chain.

Figure 1:
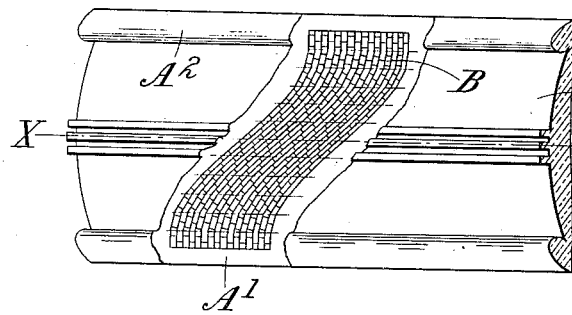
Figure 4:
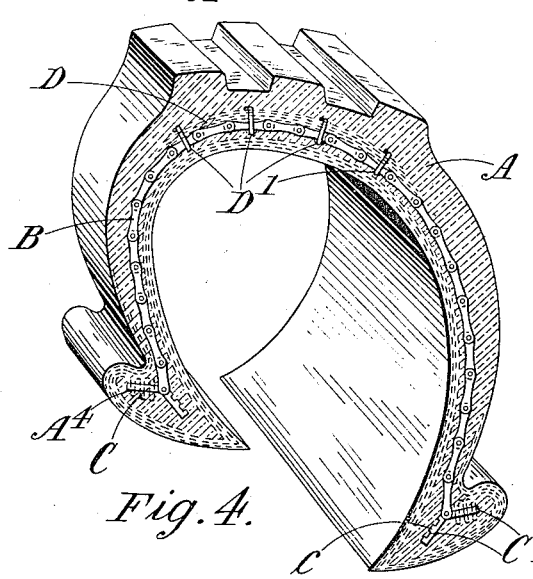
Figure 2:
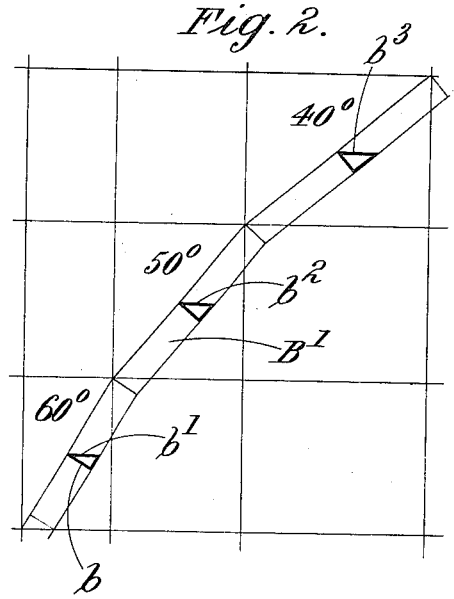
Figure 3:
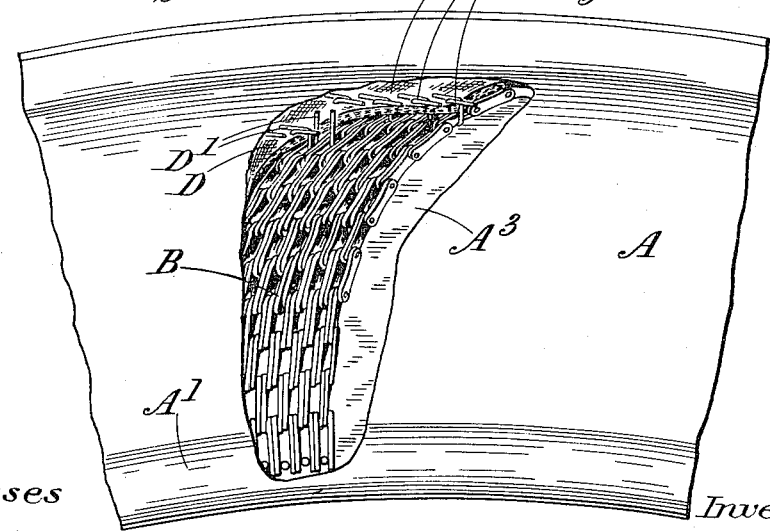

In the accompanying drawings which illustrate one method of carrying out this invention:—Figure 1 shows the arrangement of chains on a flattened-out tire-cover; Fig. 2 is a diagram; Fig. 3 is a side elevation of part of a tire broken away to show the arrangement of the chain, and Fig. 4 is a sectional perspective view through a tire along the line of one of the chains.

The same letters indicate the same parts throughout the drawings.

In Fig. 1, the tire A is shown flattened out and broken away to illustrate the course taken by the chains B. It will be observed that these are laid close together at the bead $A^1$ and start from thence approximately at right-angles to the bead but turn off toward the right at an increasingly acute angle with the center line $x$—$x$ of the tread until having crossed this line, they turn off to the left with a decreasing acuteness of angle, and finally meet the opposite bead $A^2$ approximately at right-angles once more. By this arrangement each chain which if carried across the tread at right-angles to the same would only cover a portion of the tread equal to its own width, covers a portion greater than its own width, because part of the length of the chain is made to cover the tread as well as its width. This is clearly shown in the diagram, Fig. 2, where a chain is indicated at $B^1$ and the line $b$ indicates the width of the chain throughout, whereas the lines $b^1$, $b^2$, $b^3$ are parallel to the circumferential line of the tread and obviously increase in length as the acuteness of the angle of the chain relatively to the tread increases. The portion of the chain containing the line $b^1$ is shown at an angle of 60° to the center line, whereas the portion containing the line $b^2$ is at 50° thereto and the line $b^2$ is longer than the line $b^1$; similarly the portion of chain contained in the line $b^3$ is at 40° to the center line and the line $b^3$ is again longer than the line $b^2$. In this manner the gaps which would occur between the chain lengths owing to the increase of the circumference toward the tread if the chain lengths were carried straight across from one bead to the other, are filled up and the whole area of the tire becomes evenly covered. In addition to this change of angle relatively to the circumferential line of the tire, each chain length is preferably twisted about its longitudinal axis as it is laid, so that starting with the links on edge as shown at the bead $A^1$ in Fig. 3, the chain is turned over so that its side is inclined upward out of the upright position relatively to the base-material $A^3$ whereon it lies, and this twisting permits the chain to be laid close against the base-material throughout its whole length.

It will be appreciated that the chain being more or less stiff could not be made to take the sinuous form shown in Fig. 1 and at the same time lie flat against the base-material unless so twisted, although the twisting could of course be avoided if the links were made sufficiently free relatively to one another in a lateral direction.

At the end of each chain length, a V-shaped anchoring-piece C may be provided, one arm of the anchoring-piece being carried down parallel to the inner face of the tire and the other entered into the bead beneath that portion which lies under the overturned lip of the rim when the tire is in place. The bead at this portion may be provided with canvas layers $A^4$ which further secure the arm C in the bead. Each arm C may be provided with projections $c$ to give it an additional hold in the material of the tire.

Obviously more than one layer of chains may be employed and the chains of one layer may lie across those of the other.

In order to obtain a firm connection between the chains B and the rubber of the tread, a layer of textile material D, such as canvas, is preferably placed between the rubber of the tread and the chains, and fastening means are employed for connecting the chains to the canvas, such as staples $D^1$, which embrace each chain and have their ends pushed through and interlocked with the canvas.

Although the best effect is obtained by laying the chairs close together, it will be appreciated that they may be separated throughout their length if desired though kept parallel with one another by the change of angle already described.

What I claim as my invention and desire to secure by Letters Patent is:—

1. A protective cover for pneumatic tires, comprising a plurality of chains placed side by side within the cover, and a layer of textile material within the cover below the chains, said chains extending transversely to the tread of the tire at an oblique angle to the circumferential line of the tire, said angle increasing in acuteness from the sides toward the center and being of maximum acuteness at the center, each chain being twisted about its longitudinal axis as the chain approaches the center of the tread and twisted back as it recedes from the center on the other side of the tire, so that the chain lies close to the textile material, substantially as described.

2. A protective cover for pneumatic tires, comprising a plurality of chains placed side by side within the cover, a layer of textile material within the cover below the chains, said chains extending transversely to the tread of the tire at an oblique angle to the circumferential line of the tire, said angle increasing in acuteness from the sides toward the center and being of maximum acuteness at the center, each chain being twisted about its longitudinal axis as the chain approaches the center of the tread and twisted back as it recedes from the center on the other side of the tire, so that the chain lies close to the textile material, a layer of textile material between the chains and the tread, and means for securing the chains to the last mentioned layer of textile material, substantially as described.

In testimony whereof I have signed my name to this specification in the presence of two subscribing witnesses.

CLAUDE MARIE GAUTIER.

Witnesses:
O. J. WORTH,
W. E. ROGERS.

Copies of this patent may be obtained for five cents each, by addressing the "Commissioner of Patents, Washington, D. C."